United States Patent
Zhu et al.

(10) Patent No.: US 9,483,895 B2
(45) Date of Patent: Nov. 1, 2016

(54) PAPER MONEY IDENTIFICATION METHOD AND DEVICE

(71) Applicant: Shandong New Beiyang Information Technology Co., Ltd., Shandong Province (CN)

(72) Inventors: Xiangang Zhu, Shandong Province (CN); Chuntao Wang, Shandong Province (CN); Yuzhen Du, Shandong Province (CN); Yingchan Jiang, Shandong Province (CN)

(73) Assignee: Shandong New Beiyang Information Technology Co., Ltd., Shandong Province (CN)

(*) Notice: Subject to any disclaimer, the term of this patent is extended or adjusted under 35 U.S.C. 154(b) by 4 days.

(21) Appl. No.: 14/422,344

(22) PCT Filed: Aug. 21, 2013

(86) PCT No.: PCT/CN2013/081953
§ 371 (c)(1),
(2) Date: Feb. 18, 2015

(87) PCT Pub. No.: WO2014/029334
PCT Pub. Date: Feb. 27, 2014

(65) Prior Publication Data
US 2015/0206372 A1  Jul. 23, 2015

(30) Foreign Application Priority Data
Aug. 22, 2012  (CN) .......................... 2012 1 0301344

(51) Int. Cl.
*G07D 11/00* (2006.01)
*G07D 7/20* (2016.01)
*G06K 9/62* (2006.01)

(52) U.S. Cl.
CPC ......... *G07D 11/0066* (2013.01); *G06K 9/6215* (2013.01); *G07D 7/2058* (2013.01)

(58) Field of Classification Search
CPC ........... G07D 7/2058; G07D 11/0066; G06K 9/6215

USPC ........................................................ 382/135
See application file for complete search history.

(56) References Cited

U.S. PATENT DOCUMENTS 7,639,858 B2   12/2009  Ross et al.
7,961,216 B2*  6/2011   Grindstaff ............. G01C 11/04
                                                            348/143

(Continued)

FOREIGN PATENT DOCUMENTS

CN    101727696 A    6/2010
CN    102110323 A    6/2011

(Continued)

OTHER PUBLICATIONS

Daniel Weller, Yu Hsin Lin, Ruben Perez, 18-551, Fall 2005 Group 1, Final Report, Retrieved from internet on Apr. 17, 2016. Retrieved from URL:<https://www.ece.cmu.edu/~ee551/projects/F05/Group_1_Final_Report.pdf>.*
International Search Report for International Application No. PCT/CN2013/081953 dated Dec. 5, 2013 in 3 pages.

*Primary Examiner* — Gregory F Cunningham
(74) *Attorney, Agent, or Firm* — Knobbe, Martens, Olson & Bear, LLP

(57) ABSTRACT

The disclosure discloses a paper money identification method and device. The paper money identification method comprises: obtaining entire grayscale image data of the paper money to be tested; dividing the entire grayscale image of the paper money to be tested into a plurality of areas; comparing the feature value of each area with feature value of a corresponding area in a paper money template to judge whether the two compared areas are matched; counting the number of unmatched areas of the paper money to be tested; judging whether the number of the unmatched areas is greater than a second preset threshold; and determining that the paper money to be tested is the altered money when the number of the unmatched areas is judged to be greater than the second preset threshold. By the disclosure, the accuracy of identifying the altered money is improved.

8 Claims, 9 Drawing Sheets

(56) References Cited

U.S. PATENT DOCUMENTS 8,085,989 B2 12/2011 Ryou et al.
2012/0269456 A1* 10/2012 Bekaert ................ G06T 3/4038
382/284

FOREIGN PATENT DOCUMENTS

| CN | 102890840 A | 1/2013 |
| EP | 1484719 A2 | 12/2004 |
| JP | H06318246 A | 11/1994 |

* cited by examiner

PAPER MONEY IDENTIFICATION METHOD AND DEVICE

This application is the U.S. National Phase application under 35 U.S.C. §371 of International Application PCT/CN2013/081953, filed Aug. 21, 2013, which claims priority to Chinese Disclosure Patent Application No. 201210301344.7, entitled "Paper Money Identification Method and Device", filed in State Intellectual Property Office on Aug. 22, 2012. The disclosure of each of these prior applications is incorporated by reference herein in its entirety.

TECHNICAL FIELD OF THE DISCLOSURE

The disclosure relates to the field of paper money identification, and in particular to a paper money identification method and device.

BACKGROUND OF THE DISCLOSURE

It is an important task to identify the authenticity of paper money to maintain financial order and social public interests. Currently, there are generally two kinds of counterfeit money, that is, forged money and altered money. The forged money refers to the counterfeit money which is fabricated by imitating the pattern, shape and colour etc. of the genuine money. The altered money refers to the counterfeit money which is fabricated by dig-mending, covering, obliterating, patching, shifting, reprinting etc. on the basis of the genuine money to change the original form of the genuine money. Currently, the technology of identifying the forged money has been relatively mature in domestic. However, the altered money contains some genuine money and has some anti-counterfeiting features that the genuine money has, so it is more difficult to identify.

The relevant technology discloses an altered money identification method, including steps of: a) obtaining the entire grayscale image of the paper money to be tested; b) binarizing the entire grayscale image; and c) analyzing the binarized image data to judge the authenticity of the paper money. Wherein binarizing the grayscale image is as follows: A threshold T is set. The grayscale image data is divided into two parts by T, that is, a pixel group in which the grayscale value of each pixel is greater than T and a pixel group in which the grayscale value of each pixel is less than T. Then, the grayscale value of the pixel of the pixel group in which the grayscale value of each pixel is greater than T is set to be 255 (or set to be 0), and the grayscale value of the pixel of the pixel group in which the grayscale value of each pixel is less than T is set to be 0 (or set to be 255). The grayscale values of all the pixels in the binarized image are detected line by line firstly, then the grayscale value of each pixel of each line is compared with the grayscale value of the previous pixel adjacent to the pixel in this line one by one, to judge whether the grayscale values of the current pixel and the previous pixel adjacent thereto are different. When the grayscale values are different, the position of the current pixel (simply an abrupt changed dot for short) is recorded. When the grayscale values of all the pixels in the binarized image are detected line by line, the positions of all the abrupt changed dots detected are judged whether to comply with a preset rule, for example, the positions of all the abrupt changed dots are within columns of certain scope. When the positions of the abrupt changed dots comply with the preset rule, a spliced seam is judged to be present in the paper money to be tested, that is, the paper money to be tested is judged to be the altered money. When there is no abrupt changed dot or the positions of the abrupt changed dots do not comply with the preset rule, the grayscale values of all the pixels in the binarized image are detected column by column. The grayscale value of each pixel of each column is compared with the grayscale value of previous pixel adjacent to the pixel in this column one by one to judge whether the grayscale values of the current pixel and the previous pixel adjacent thereto are different. When the grayscale values are different, the position of the current pixel (simply an abrupt changed dot for short) is recorded. After the grayscale values of all the pixels in the binarized image are detected column by column, the positions of all the abrupt changed dots detected are judged whether to comply with the preset rule, for example, the positions of all the abrupt change pixels are within lines of certain scope. When the positions of the abrupt changed dots comply with the preset rule, a spliced seam is judged to be present in the paper money to be tested, that is, the paper money to be tested is judged to be the altered money. Otherwise, the paper money to be tested is judged to be the unaltered money. For the altered money with obvious altering features, for example the altered money with obvious spliced seam, the spliced seam in the image can be extracted by binarizing the grayscale image so as to implement the identification of the altered money.

However, since the grayscale values of all the pixels in the binarized image of the grayscale images are simplified to be two levels (0 or 255) from 256 levels (0-255), the adjacent pixels with the minor grayscale value difference may be very likely processed as the pixels with the same grayscale value. At this time, it is impossible to detect the difference of the grayscale values of the adjacent pixels by dot-to-dot comparison. An entire image of an altered money with a relatively obvious spliced seam is shown in FIG. 1a. As shown in this image, there is an obvious difference between the grayscale value of the pixel on the spliced seam and the grayscale value of the pixel on both sides of the spliced seam. An entire image of an altered money without obvious spliced seams is shown in FIG. 1b. As shown in this image, there is an unobvious difference between the grayscale value of the pixel on the spliced seam and the grayscale value of the pixel on both sides of the spliced seam. The entire images of two pieces of altered money as shown in FIG. 1a and FIG. 1b are binarized by the same threshold T=180. FIG. 2a is an image obtained by binarizing the entire image as shown in FIG. 1a, and FIG. 2b is an image obtained by binarizing the entire image as shown in FIG. 1b. Obviously, it may be easy to detect the spliced seam present in the altered money from the image data of the image as shown in FIG. 2a, but it is very difficult to detect the spliced seam present in the altered money from the image data of the image as shown in FIG. 2b. Therefore, it can be seen that the method for identifying the altered money by binarizing the grayscale image has a disadvantage of inaccurate detection.

No effective solution has been proposed for the problem that the altered money identification method is inaccurate in the relevant art.

SUMMARY OF THE DISCLOSURE

The main goal of the disclosure is to provide a paper money identification method and device, by which the problem that the altered money identification method is inaccurate in the relevant art is solved.

To this end, according to one aspect of the disclosure, there is provided a paper money identification method.

The paper money identification method according to the disclosure includes that: entire grayscale image data of the paper money to be tested is obtained; the entire grayscale image of the paper money to be tested is divided into a plurality of areas, and a feature value of the image data of each area is calculated respectively; the feature value of each area is compared with the feature value of a corresponding area in a paper money template to judge whether the two compared areas are matched, wherein, the two compared areas are judged to be unmatched if a difference between the feature values of the two compared areas is greater than a first preset threshold, otherwise the two compared areas are judged to be matched; the number of unmatched areas of the paper money to be tested is counted; the number of the unmatched areas of the paper money to be tested is judged whether to be greater than a second preset threshold; and the paper money to be tested is determined to be the altered money when the number of the unmatched areas of the paper money to be tested is judged to be greater than the second preset threshold.

Further, for each area, the feature value of the image data of the area is calculated as follows: dividing the area into a first area and a second area equally; calculating a grayscale average of the first area and a grayscale average of the second area respectively; and adopting an absolute value of a difference between the grayscale average of the first area and the grayscale average of the second area as the feature value of the image data of the area.

Further, obtaining the entire grayscale image data of the paper money to be tested includes: obtaining entire original grayscale image data of the paper money to be tested; and compensating for and correcting the entire original grayscale image data to generate entire final grayscale image data of the paper money to be tested, and adopting the entire final grayscale image data as the entire grayscale image data of the paper money to be tested.

Further, dividing the entire grayscale image of the paper money to be tested into a plurality of areas, and calculating the feature value of the image data of each area respectively includes: dividing the entire grayscale image of the paper money to be tested into a plurality of areas in many different dividing ways, and calculating a feature value of the image data of each area in each dividing way respectively. Comparing the feature value of each area with the feature value of the corresponding area in the paper money template to judge whether the two compared areas are matched includes: comparing the feature value of each area in each of many different dividing ways with the feature value of a corresponding area in a paper money template in a corresponding dividing way to judge whether the two compared areas are matched, wherein, the paper money to be tested is determined to be the altered money when the number of the unmatched areas of the paper money to be tested is judged to be greater than the second preset threshold in any way of many different dividing ways.

Further, before dividing the entire grayscale image of the paper money to be tested into a plurality of areas and calculating the feature value of the image data of each area respectively, the method includes that: detecting whether a spliced seam is present according to the entire grayscale image; and judging whether the spliced seam is detected according to a detection result, wherein, the paper money to be tested is determined to be the altered money when the spliced seam is determined to be detected, and then the entire grayscale image of the paper money to be tested is divided into a plurality of areas and the feature value of the image data of each area is calculated respectively when the spliced seam is determined to be undetected.

Further, obtaining the entire grayscale image data of the paper money to be tested includes obtaining the entire grayscale image data of the paper money to be tested in many different ways, wherein the paper money to be tested is judged to be the altered money when the entire grayscale image data obtained in any way determines that the paper money to be tested is the altered money.

To this end, according to another aspect of the disclosure, there is provided a paper money identification device. The paper money identification device includes: an obtaining unit, configured to obtain entire grayscale image data of the paper money to be tested; a calculation unit, configured to divide the entire grayscale image of the paper money to be tested into a plurality of areas, and calculate a feature value of the image data of each area respectively; a comparison unit, configured to compare the feature value of each area with the feature value of a corresponding area in a paper money template to judge whether the two compared areas are matched, wherein, the two compared areas are judged to be unmatched if the difference between the feature values of the two compared areas is greater than a first preset threshold, otherwise the two compared areas are judged to be matched; a counting unit, configured to count the number of unmatched areas of the paper money to be tested; a first judgment unit, configured to judge whether the number of the unmatched areas of the paper money to be tested is greater than a second preset threshold; and an identification unit, configured to determine that the paper money to be tested is the altered money when the number of the unmatched areas of the paper money to be tested is judged to be greater than the second preset threshold.

Further, for each area, the calculation unit calculates the feature value of the image data of the area as follows: dividing the area into a first area and a second area equally; calculating a grayscale average of the first area and a grayscale average of the second area respectively; and adopting an absolute value of the difference between the grayscale average of the first area and the grayscale average of the second area as the feature value of the image data of the area.

Further, the obtaining unit obtains the entire grayscale image data of the paper money to be tested as follows: obtaining entire original grayscale image data of the paper money to be tested; and compensating for and correcting the entire original grayscale image data to generate entire final grayscale image data of the paper money to be tested, and adopting the entire final grayscale image data as the entire grayscale image data of the paper money to be tested.

Further, the calculation unit includes: a division module, configured to divide the entire grayscale image of the paper money to be tested into a plurality of areas in many different dividing ways, and a calculating module, configured to calculate a feature value of the image data of each area in each dividing way respectively. The comparison unit is configured to compare the feature value of each area in each of many different dividing ways with the feature value of a corresponding area in a paper money template in a corresponding dividing way to judge whether the two compared areas are matched. The identification unit is configured to determine that the paper money to be tested is the altered money when the number of the unmatched areas of the paper money to be tested is judged to be greater than the second preset threshold in any way of many different dividing ways.

Further, the paper money identification device further includes: a detecting unit, configured to detect whether a spliced seam is present according to the entire grayscale image data before dividing the entire grayscale image of the paper money to be tested into a plurality of areas and calculating the feature value of the image data of each area respectively; and a second judgment unit, configured to judge whether the spliced seam is detected according to a detection result, wherein, the identification unit is configured to determine that the paper money to be tested is the altered money when determining that the spliced seam is detected, and the calculation unit is configured to divide the entire grayscale image of the paper money to be tested into a plurality of areas and calculate the feature value of the image data of each area respectively when determining that the spliced seam is not detected.

Further, the obtaining unit is configured to obtain the entire grayscale image data of the paper money to be tested in many different ways respectively, and the identification unit judges that the paper money to be tested is the altered money when the entire grayscale image data obtained in any way determines that the paper money to be tested is the altered money.

By means of the paper money identification method or paper money identification device of the disclosure, the paper money to be tested is judged whether to be the altered money by obtaining entire grayscale image data of the paper money to be tested, dividing the entire grayscale image of the paper money to be tested into a plurality of areas, and calculating a feature value of the image data of each area respectively, and comparing the feature value of each area with the feature value of a corresponding area in a paper money template to judge whether the two compared areas are matched. The accuracy of identifying the altered money is improved compared with the identification by the binarized grayscale value.

BRIEF DESCRIPTION OF THE DRAWINGS

The accompanying drawings, which constitute a part of this application, serve to provide a further understanding of the disclosure. The schematic embodiments of the disclosure and description thereof serve to explain the disclosure rather than to limit the disclosure inappropriately. In the drawings.

DETAILED DESCRIPTION OF THE EMBODIMENTS

It should be noted that the embodiments of the application and the features of the embodiments can be combined with each other without any conflict. The disclosure will be described below in detail with reference to the accompanying drawings and in conjunction with the embodiments.

Figure 3:
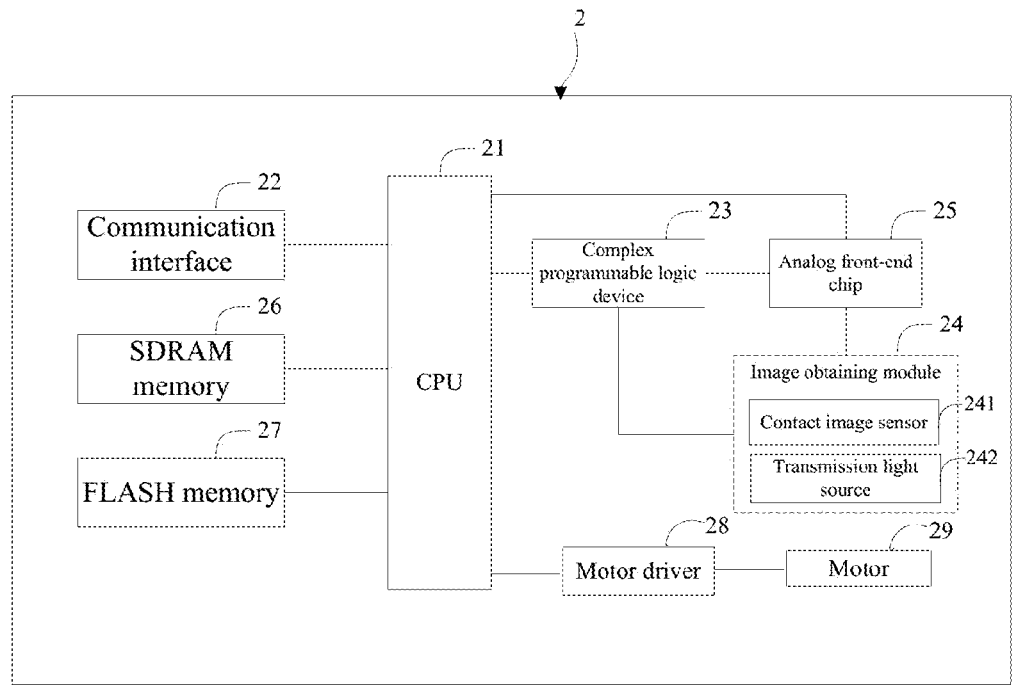
FIG. 3 is a composition diagram of a paper money identification device according to one embodiment of the disclosure.

FIG. 3 is a composition diagram of a paper money identification device according to one embodiment of the disclosure. As shown, the paper money identification device 2 includes: a CPU 21, a communication interface 22, a Complex Programmable Logic Device (CPLD for short) 23, an image obtaining module 24, an analog front-end chip 25, a SDRAM memory 26, a Flash memory 27, a motor driver 28 and a motor 29.

The CPU 21 is configured to control the work of other modules. For example, the CPU 21 controls the communication interface 22 to finish the communication between the paper money identification device and a paper money identification requesting device (such as a personal computer, network equipment or the like connected to the paper money identification device). The CPU 21 controls the CPLD 23 to initiate an image collection task. The CPU 21 controls the motor driver 28 to drive the motor 29 to rotate, etc.

The communication interface 22 is configured to receive a control command sent by the paper money identification requesting device and to return data to the paper money identification requesting device, wherein, the received control command is an image collection parameter to be preset during paper money identification process, such as the image collection resolution, the image collection speed or the like, the returned data includes the grayscale image data of paper money to be tested and the identification result of the paper money to be tested or the like, and the commonly used communication interface is the USB interface or the serial port.

The CPLD 23 is configured to receive a control signal for initiating image collection and to output control timing required by the image obtaining module 24 and the analog front-end chip 25 to finish collecting original grayscale image data of the paper money to be tested. The CPLD has the characteristics of fast processing speed and precise control and can implement the precise control of the image collection-related signal timing.

The image obtaining module 24 includes a Contact Image Sensor (hereinafter referred to as CIS) 241 and a transmission light source 242. CIS 241 contains a plurality of light receivers and a plurality of light emitters, wherein, the plurality of light receivers are configured to receive optical signals where the paper money to be tested carries image information and to convert them into electrical signals, and finally to transmit analogue voltage values in one-to-one correspondence with pixels to the analog front-end chip 25, and the plurality of light emitters are configured to irradiate the paper money to be tested, so that the plurality of light receivers receive the reflected light rays reflected by the paper money to be tested and collect the reflected images of the paper money to be tested. The transmission light source 242 is configured to provide the transmission light source required by the CIS 241 to collect a transmission image.

The analog front-end chip 25 is configured to process the analogue voltage value of each pixel output by the CIS 241, such as migration processing, gain processing or the like, then to AD convert the analogue voltage value of each pixel to obtain a hexadecimal grayscale value in one-to-one correspondence with the pixel, finally to generate entire original grayscale image data of the paper money to be tested, wherein, the grayscale level of the pixel in the original grayscale image is determined by the AD conversion accuracy. For example, when the AD conversion accuracy is 8-bit, the grayscale of the pixel in the original grayscale image has 256 levels, that is, the grayscale level of the pixel is an integer from 0 to 255.

The SDRAM memory 26 is configured to store original grayscale image data and final grayscale image data, wherein, the original grayscale image data refers to grayscale image data which is generated by performing AD converting, via the analog front-end chip 25, on the image data collected by the CIS 241, and the final grayscale image data refers to image data generated by compensating for and correcting the original grayscale image data and used to detect the grayscale feature.

FLASH memory 27 is configured to store the control procedure, the type parameter of the light source, the light-emitting wavelength parameter of the light source, the feature value of each template, and also used to store parameters M, N, D, a, and b required to detect the grayscale feature based on the entire image, as well as the first preset threshold, the second preset threshold, and the third preset threshold. Wherein, The type parameter of the light source is used to determine that the light source used when the CIS 241 collects the original image is a transmitted light or/and a reflected light. The light-emitting wavelength parameter of the light source is used to determine which wavelength of light the light source emits when the CIS 241 collects the original image. The feature value of each template is used to compare with the feature value of the entire grayscale image of the paper money to be tested corresponding thereto, and to provide judgment basis for paper money identification. The parameters M, N, and D are used to perform mesh generation in the final entire grayscale image of the paper money to be tested, and the parameters a and b are used to group the generated mesh. The first preset threshold is used to judge whether each mesh group grouped matches the mesh group corresponding to the template data. The second preset threshold is used to judge whether the paper money to be tested is the altered money. The third preset threshold is used to judge whether the current pixel is an abrupt changed dot when a spliced seam is detecting.

The motor driver 28 is configured to provide drive current to drive the motor 29 to rotate.

The motor 29 is configured to drive the paper money to be tested to move within a transfer passage. Every time when the motor 29 drives the paper money to be tested to move within the transfer passage by a minimum unit (that is, one dot line), the CIS 241 executes the image collection once. The motor 29 may be a stepper motor and may also be a DC motor.

Further, the paper money identification device also includes a money feeding detection sensor 30, configured to detect whether there is paper money to be tested within the transfer passage. When the money feeding detection sensor 30 outputs a detection signal that there is the paper money to be tested within the transfer passage, the CPU 21 controls the work of the image obtaining module 24 according to the detection signal.

Figure 4:
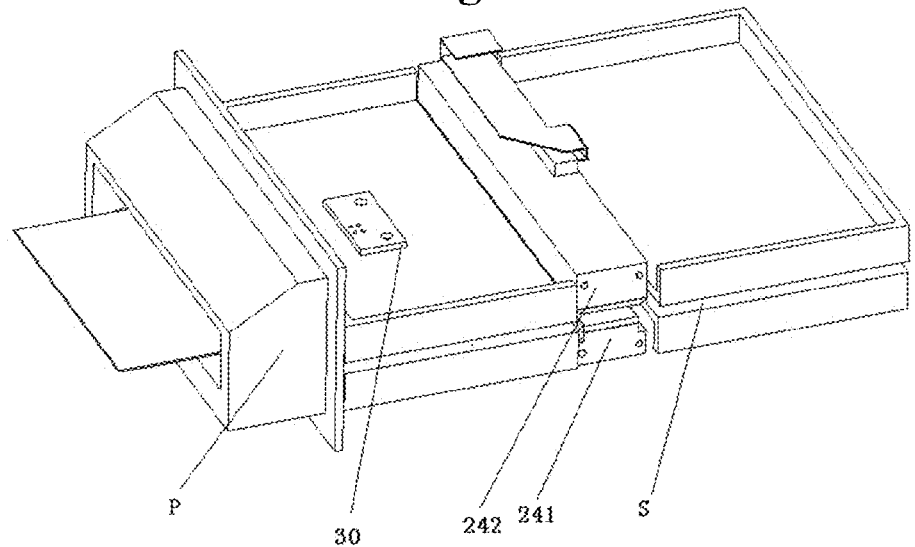
FIG. 4 is a structure diagram of a paper money identification device according to one embodiment of the disclosure.

FIG. 4 is a structure diagram of a paper money identification device according to one embodiment of the disclosure. As shown, the money feeding opening P, the money feeding detection sensor 30, and the image obtaining module 24 of the paper money identification device are arranged in the transfer passage S in order along a paper money transfer direction. Wherein the money feeding detection sensor 30 is located near the money feeding opening P, the CIS 241 and the transmission light source 242 of the image obtaining module 24 are disposed oppositely, located on the both sides of the transfer passage S of the paper money identification device respectively. When the money feeding detection sensor 30 outputs a signal that there is the paper money in the money feeding opening P, the CPU 21 controls the transmission light source 242 and/or the light emitters of the CIS 241 to start emitting light while controlling the motor 29 to drive the paper money to move. The light receiver of CIS 241 receives the transmitted light and/or the reflected light on the paper money to be tested, and collects the image of the paper money to be tested. When the transmission light source 242 emits light, the CIS 241 receives the transmitted light penetrating through the paper money to be tested, and collects the transmitted image of the paper money to be tested. When the light emitters of the CIS 241 emits light, the light receiver receives the reflected light returned by the paper money to be tested, and collects the reflected image of the paper money to be tested.

Figure 5:
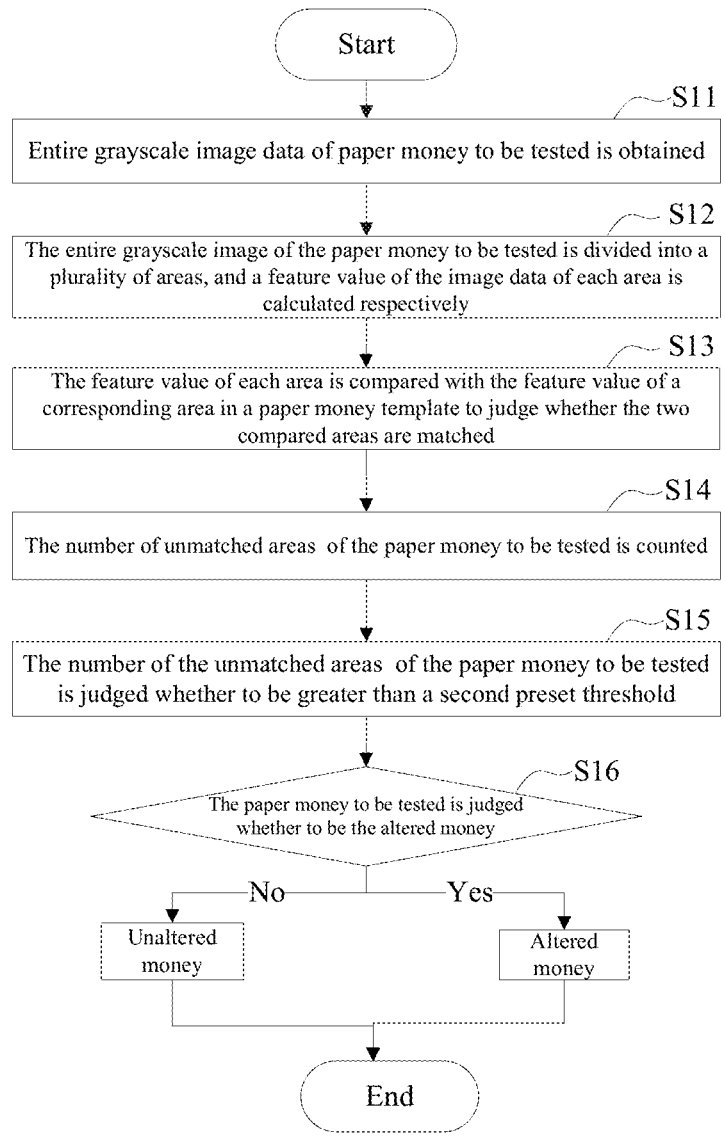
FIG. 5 is a flow chart of a first embodiment of a paper money identification method according to the disclosure.

FIG. 5 is a flow chart of a first embodiment of a paper money identification method according to the disclosure. The method includes that:

Step S11: The entire grayscale image data of the paper money to be tested is obtained.

In this step, the entire grayscale image data of the paper money to be tested may be obtained by the image obtaining module 24 and the analog front-end chip 25 of the paper money identification device.

Step S12: The entire grayscale image of the paper money to be tested is divided into a plurality of areas, and a feature value of the image data of each area is calculated respectively.

Step S13: The feature value of each area is compared with the feature value of a corresponding area in a paper money template to judge whether the two compared areas are matched.

The feature value of each area is compared with the feature value of the corresponding area in the paper money template. The two compared areas are judged to be unmatched if the difference between the feature values of the two compared areas is greater than a first preset threshold, otherwise the two compared areas are judged to be matched.

Step S14: The number of unmatched areas of the paper money to be tested is counted.

Step S15: The number of the unmatched areas of the paper money to be tested is judged whether to be greater than a second preset threshold.

Step S16: The paper money to be tested is judged whether to be the altered money.

The paper money to be tested is determined to be the altered money when the number of the unmatched areas of the paper money to be tested is judged to be greater than the second preset threshold through the Step S15.

Figure 6:
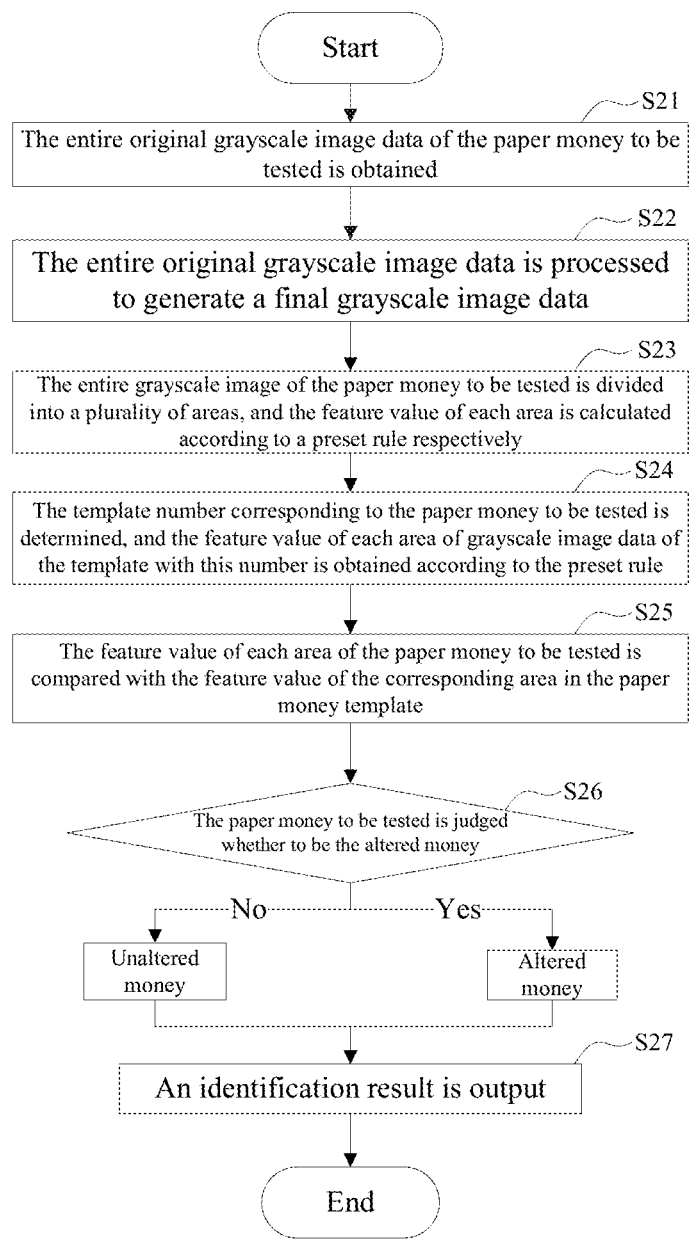
FIG. 6 is a flow chart of a second embodiment of a paper money identification method according to the disclosure.

FIG. 6 is a flow chart of a second embodiment of a paper money identification method according to the disclosure. The embodiment may be used as a preferred embodiment of the first embodiment. As shown in FIG. 6, the method includes that:

Step S21: The entire original grayscale image data of the paper money to be tested is obtained.

After the CPU receives the signal that there is the paper money in the money feeding opening P, the light source is turned on, and the control signal for initiating image collection is sent to the CPLD. The CPLD outputs the control timing required by the CIS and the analog front-end chip to collect the image. The CIS receives the light emitted by the light source, converts an optical signal carrying image information of each pixel in one dot line of the paper money to be tested into an electrical signal, and transmits an analogue voltage value in one-to-one correspondence with a pixel to the analog front-end chip. The analog front-end chip performs migration processing and gain processing on the voltage value of each pixel, then converts the analogue voltage value of each pixel to digital voltage value to obtain a hexadecimal grayscale value in one-to-one correspondence with the pixel, thereby finishing collection of one dot line grayscale image data. The CPU stores the collected grayscale image data of one dot line pixel of the paper money to be tested in the SDRAM memory. The motor drives the paper money to be tested to move one dot line within the transfer passage. The paper money identification device collects the next one dot line grayscale image data again, and so on. When the motor drives the whole paper money to be tested to travel through the transfer passage, the paper money identification device finishes the collection of the entire original grayscale image data of the paper money to be tested and stores it in the SDRAM memory.

In the embodiment, when the paper money identification device obtains the original grayscale image data of the paper money to be tested, the transmission light source may emit light, and CIS obtains the transmitted image data, or the light emitter integrated inside the CIS may also emit light, and the CIS obtains reflected image data. Preferably, the transmission light source and the light emitter integrated inside the CIS may emit light in a time-sharing way alternately. The CIS obtains one dot line transmitted image data and one dot line reflected image data while the motor drives the paper money to be tested to move one dot line within the transfer passage, thus after the motor drives the whole paper money to be tested to pass through the transfer passage, two entire images of the paper money to be tested may be collected, that is, an entire transmitted image and an entire reflected image.

Preferably, in the paper money identification device of the embodiment of the disclosure, the transmission light source and the light emitter of the CIS may be light sources emitting light of a single wavelength, and may also be light sources emitting light of different wavelengths (for example, infrared light, ultraviolet light) in a time-sharing way alternately as needed. If the transmission light source or the light emitter of the CIS emits light of different wavelengths in a time-sharing way alternately, the light receiver of the CIS may collect the image of the paper money to be tested respectively when the paper money to be tested is irradiated by light of different wavelengths, so as to obtain multiple images of the paper money to be tested based on the light of different wavelength.

Step S22: The entire original grayscale image data is processed to generate a final grayscale image data.

The entire original grayscale image data stored in the SDRAM memory is read, and the grayscale value of each pixel is compensated for and corrected to generate an entire final grayscale image data and store it in the SDRAM memory. The purpose of compensation for and correction is to eliminate errors caused during image collection and data transmission so that the grayscale value of each pixel in the grayscale image data reflects the actual grayscale of the pixel of the paper money to be tested more accurately.

For Step S11 in the first embodiment, the entire grayscale image data of the paper money to be tested may be the entire grayscale image data directly obtained, and may also be the final grayscale image data obtained based on Step S22 of the embodiment.

Step S23: The entire grayscale image of the paper money to be tested is divided into a plurality of areas, and the feature value of each area is calculated according to a preset rule respectively.

The final grayscale image data of the paper money to be tested is analyzed. The entire grayscale image of the paper money is divided into M*N meshes, each of which corresponds to different area. The average of grayscale values of all the pixels within each mesh is calculated respectively. Then the M*N meshes are grouped. Every a*b meshes is a group, in total of s groups. Since each mesh corresponds to different area, correspondingly, each group (mesh group) also corresponds to different area. Then, the feature value di of each group of meshes is calculated according to the preset value. In the embodiment, the entire grayscale image is divided into s mesh groups, that is, the entire grayscale image is divided into s different areas, and then the feature value of each area in s different areas is obtained respectively.

Step S24: The template number corresponding to the paper money to be tested is determined, and the feature value of each area of grayscale image data of the template with this number is obtained according to the preset rule.

The original grayscale image data of the paper money to be tested collected by the paper money identification device is influenced by many factors, such as the type of the light source (the reflected light or the transmission light), the wavelength of the light that the light source emits, the denomination of the paper money to be tested, the orientation of the paper money to be tested, the money feeding direction in which the paper money to be tested is fed into the paper money identification device or the like. Different factors will result in different original grayscale image data collected. Therefore, many different templates may be determined according to different factors such as the type of the light source, the wavelength of the light that the light source emits, the denomination of the paper money to be tested, the orientation of the paper money to be tested, the money feeding direction in which the paper money to be tested is fed into the paper money identification device or the like, each of which is set up with a unique number by which the CPU queries the template. The feature values of the grayscale image data of many templates are stored in the Flash memory. These feature values are used to compare the feature value obtained by calculating the final grayscale image data of the paper money to be tested during the paper money identification process. The feature value of the grayscale image data of each template is obtained by training in advance, that is, for each template, the feature value of each area of the template is obtained by collecting a certain number of images of genuine money samples based on the template and calculating the final grayscale image data of the samples to obtain the feature value of each area of the template according to the preset rule.

After the final grayscale image data of the paper money to be tested is generated, the CPU reads the final grayscale image data in the SDRAM memory, processes it, and determines the denomination of the paper money to be tested by obtaining the length and the width of the image. In the case where the denomination of the paper money to be tested and the type of the light source when the original image is collected as well as the wavelength of the light which the light source emits, the orientation of the paper money to be tested may be determined by analyzing features of some special markers in the image, the special markers may be number, watermark, optically variable ink character, invisible character or the like. If it is known that the collected paper money image is a reflected image, the orientation of the paper money to be tested may be judged by detecting whether there is a number in the image, and the money feeding direction in which the paper money to be tested is fed into the paper money identification device may be determined by detecting the position of the number in the image. After the denomination of the paper money to be tested, the orientation of the paper money to be tested, and the money feeding direction of the paper money to be tested are determined, the template number corresponding to the paper money to be tested may be determined according to the type of the light source and the wavelength of the light which the light source emits, the feature value of each area of the grayscale image data of the template with this number is read from the Flash memory according to the determined template number.

Step S25: The feature value of each area of the paper money to be tested is compared with the feature value of the corresponding area in the paper money template.

The feature value of each area of the entire final grayscale image data of the paper money to be tested obtained in Step S23 is compared with the feature value of each area of the grayscale image data of corresponding template of the paper money to be tested obtained in Step S24.

The specific comparison method is as follows: The feature values of each group of meshes of the entire final grayscale image data of the paper money to be tested are compared with the feature values of the corresponding group of meshes of the grayscale image data of the template corresponding to the paper money to be tested respectively. When the difference between the compared feature values of the two groups of meshes exceeds the first preset threshold, the mesh group of the paper money to be tested and the mesh group corresponding to the template are judged to be unmatched. The number j (j is an integer greater than or equal to 0, less than or equal to s) of the unmatched mesh groups is counted and recorded after finishing the one-to-one comparison of the feature values of all the mesh groups of the entire grayscale image data of the paper money to be tested and the feature values of the corresponding mesh groups of the grayscale image data of the template.

Optionally, in the embodiment, the feature values may be compared by using each mesh as one area with corresponding area in the template, and the feature values may also be compared by using each mesh group as one area with corresponding area in the template.

Step S26: The paper money to be tested is judged whether to the altered money.

The number j of the mesh groups in which the entire grayscale image data of the paper money to be tested does not match the grayscale image data of the template is compared with the second preset threshold. The paper money to be tested is judged to be the altered money if j is greater than the second preset threshold, otherwise, the paper money to be tested is judged to be the unaltered money.

Step S27: An identification result is output.

The identification result whether the paper money to be tested is the altered money is passed to the paper money identification requesting device through the communication interface.

Figure 7A:
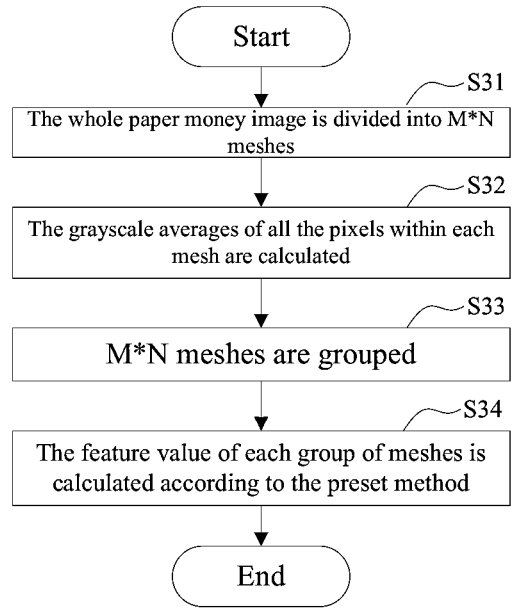
FIG. 7a is a flow chart of calculating a feature value of each area based on an entire grayscale image according to an embodiment of the disclosure.

FIG. 7a is a flow chart of calculating a feature value of each area based on an entire grayscale image according to an embodiment of the disclosure. As shown, the method includes that:

Step S31: The whole paper money image is divided into M*N meshes.

Figure 9:
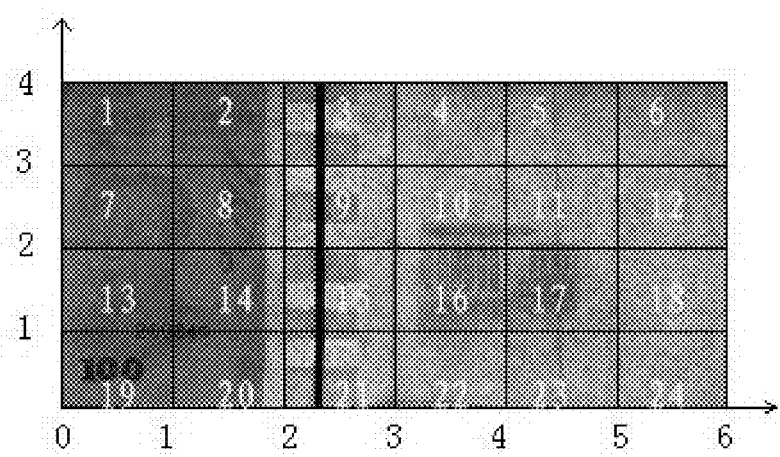
FIG. 9 is a diagram of an image mesh grouping method based on the entire grayscale feature value detection according to an embodiment of the disclosure.

The CPU reads the final grayscale image data of the paper money to be tested stored in the SDRAM memory, and calculates the number x of the pixels in the length direction of the image (that is, the longer side direction of the paper money to be tested) and the number y of the pixels in the width direction of the image (that is, the shorter side direction of the paper money to be tested). The entire image is divided into M*N meshes, where the parameters M and N are positive integers greater than 1, the values of M and N are preset in advance, M is the number of the meshes divided in the length direction of the image, and N is the number of the meshes divided in the width direction of the image. For example, for the paper money to be tested such as the fifth series of RMB having a denomination of 100, the length thereof is 155 mm, and the width thereof is 77 mm. When the scanning resolution of the identification device is 50 dpi*50 dpi, the number x of the pixels in the length direction of the collected image is 306, the number y of the pixels in the width direction is 152. The M*N meshes are obtained by dividing the 306*152 pixels into meshes. For example, assume that the number M of the meshes divided in the length direction of the image is 6, the number N of the meshes divided in the width direction of the image is 4, the entire image is divided into M*N=24 meshes, and the number of the pixels within each mesh is 51*38. FIG. 9 shows a diagram for grouping.

Step S32: The grayscale averages of all the pixels within each mesh are calculated.

The M*N meshes are obtained by dividing the entire image into meshes. The grayscale averages of all the pixels within each mesh are calculated. For example, the grayscale average of 51*38 pixels within each mesh of 24 meshes in Step S31 is calculated respectively.

Step S33: M*N meshes are grouped.

The M*N meshes are grouped. Every a*b meshes are in a group, there is in total s groups, where the parameters a and b are positive integers, the values of a and b are preset in advance, a is the number of adjacent meshes of each group of meshes in the length direction of the image, and b is the number of adjacent meshes of each group of meshes in the width direction of the image.

If 24 meshes obtained by grouping the meshes of the grayscale image of the paper money to be tested such as the fifth series of RMB having a denomination of 100 in Step S31 are grouped with a=2 and b=2, 24 meshes are divided into 6 groups of meshes in total, each group of meshes having 4 meshes. As in the diagram as shown in FIG. 9, the meshes of the paper money to be tested are grouped with a=2 and b=2, as shown in Table 1:

TABLE 1

| Grouping number | Mesh number contained within the group |
|---|---|
| 1 | 1, 2, 7, 8 |
| 2 | 3, 4, 9, 10 |
| 3 | 5, 6, 11, 12 |
| 4 | 13, 14, 19, 20 |
| 5 | 15, 16, 21, 22 |
| 6 | 17, 18, 23, 24 |

Step S34: The feature value of each group of meshes is calculated according to the preset method.

The feature value of each group of meshes grouped is calculated, where the calculation method of the feature value di of the i-th (where i is a positive integer greater than 0, less than or equal to s) group of meshes is as follows: The i-th meshes are divided into two groups equally, recorded as group A and group B. For example, the i-th group of meshes are divided into two groups in which the number of adjacent meshes in the length direction of the image is a/2, and the number of adjacent meshes in the width direction of the image is b, or in which the number of adjacent meshes in the length direction of the image is a, and the number of adjacent meshes in the width direction of the image is b/2. The averages GrayAi and GrayBi of grayscale values of the meshes contained in group A and group B are calculated respectively, and a difference between GrayAi and GrayBi is calculated. The absolute value of the difference is the feature value di of the i-th group of meshes.

After 24 meshes obtained by grouping the meshes of the grayscale image of the paper money to be tested such as the fifth series of RMB having a denomination of 100 in Step S31 are grouped by the grouping method in Table 1 in Step S33, for the i-th group of meshes, 4 meshes in the group are divided into two groups in which the number a/2 of adjacent meshes in the length direction of the image is 1, and the number b of adjacent meshes in the width direction of the image is 2, recorded as group A and group B, each group containing 2 meshes. The averages GrayAi of grayscale values of two meshes in group A and the averages GrayBi of grayscale values of two meshes in group B are calculated respectively. The absolute value of the difference between the GrayAi and the GrayBi is calculated, obtaining the feature value di of the i-th group. As in the first group shown in Table 1, assume that the grayscale average of mesh 1 is g1, the grayscale average of mesh 2 is g2, the grayscale average of mesh 7 is g7, the grayscale average of mesh 8 is g8, the grayscale average GrayA1 of the meshes in group A (that is, mesh 1 and mesh 7) of the first group is (g1+g7)/2, and the grayscale average GrayB1 of the meshes in group B (that is, mesh 2 and mesh 8) of the first group is (g2+g8)/2, then the feature value d1 in the first group is the absolute value of the difference between GrayA1 and GrayB1, that is, d1=|GrayA1−GrayB1|.

For the grayscale image data of the template of each number stored in the Flash memory, the feature value of each group of meshes is obtained by training in advance. The specific method is as follows: A certain number of images of genuine money samples based on the template are collected, the grayscale image data of each sample is calculated according to the parameters M, N, a and b set in advance by the rule in Step S31-Step S34 to obtain the feature value of each group of meshes of the grayscale image data of the sample. All the feature values of the same mesh of the template based on the grayscale image data of all the samples are calculated according to an operation rule to obtain the feature value of this group of meshes of the template, thereby obtaining the feature value of each group of meshes of the template. Wherein, the operation rule used to calculate the feature value of a certain group of meshes of a certain template may be to calculate the average of all the feature values of this group of meshes based on the grayscale image data of all the samples and use the average as the feature value of this group of meshes, or may also be to calculate the average and variance of all the feature values of this group of meshes based on the grayscale image data of all the samples and use the value obtained by summing up the average and the variance as the feature value of this group of meshes, or use the value obtained by subtracting the variance from the average as the feature value of this group of meshes. In the disclosure, the calculation method of the feature value of each group of meshes of the template is not limited to the above methods.

Preferably, in Step S33, the M*N meshes obtained by dividing the meshes of the grayscale image of the paper money to be tested may be grouped by multiple grouping methods. In Step S34, the feature values of all the mesh groups obtained by each mesh grouping method are calculated according to the preset method respectively. A group of feature values of the grayscale image of the paper money to be tested are obtained in each mesh grouping case. The grayscale image of the template is divided into meshes by the same mesh dividing method. The meshes are grouped by multiple grouping methods which are the same. Similarly, a group of feature values of the grayscale image of the template are obtained in each mesh grouping case. During paper money identification flow, each group of feature values of the grayscale image of the paper money to be tested is compared with the each group of feature values of the grayscale image of the template one by one, and whether the paper money to be tested is the altered money is judged according to the comparison result of each group of feature values.

Figure 7B:
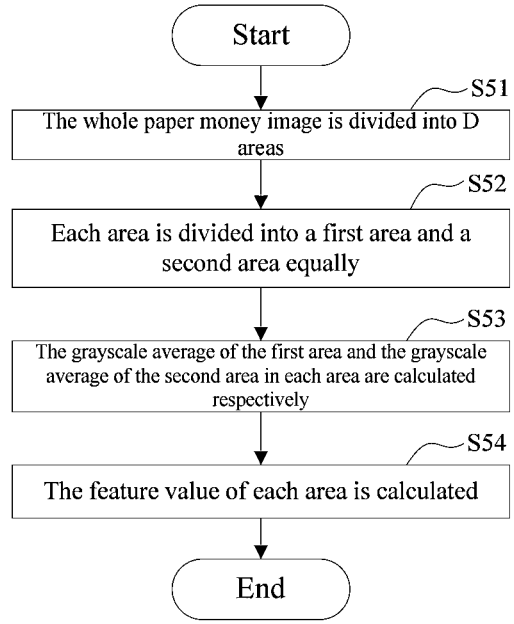
FIG. 7b is another flow chart of calculating a feature value of each area based on an entire grayscale image according to an embodiment of the disclosure.

FIG. 7b is another flow chart of calculating a feature value of each area based on an entire grayscale image according to an embodiment of the disclosure. As shown, the method includes that:

Step S51: The whole paper money image is divided into D areas.

Step S52: Each area is divided into a first area and a second area equally.

Step S53: The grayscale average of the first area and the grayscale average of the second area in each area are calculated respectively.

Step S54: The feature value of each area is calculated.

The difference between the grayscale average of the first area and the grayscale average of the second area in each area is calculated respectively, and the absolute value of the difference is used as the feature value of the grayscale image data of the area.

In the paper money identification method provided by the embodiment of the disclosure, the absolute value of the difference between the grayscale average of the first area and the grayscale average of the second area in each area is used as the feature value of the grayscale image data of the area. By means of the characteristics that there must be a difference between the grayscale values of the grayscale image of the adjacent part where the altered money is spliced, whether the paper money to be tested is the altered money is easily identified by comparing the difference of the grayscale values of the adjacent area in the same paper money with the template.

Figure 8:
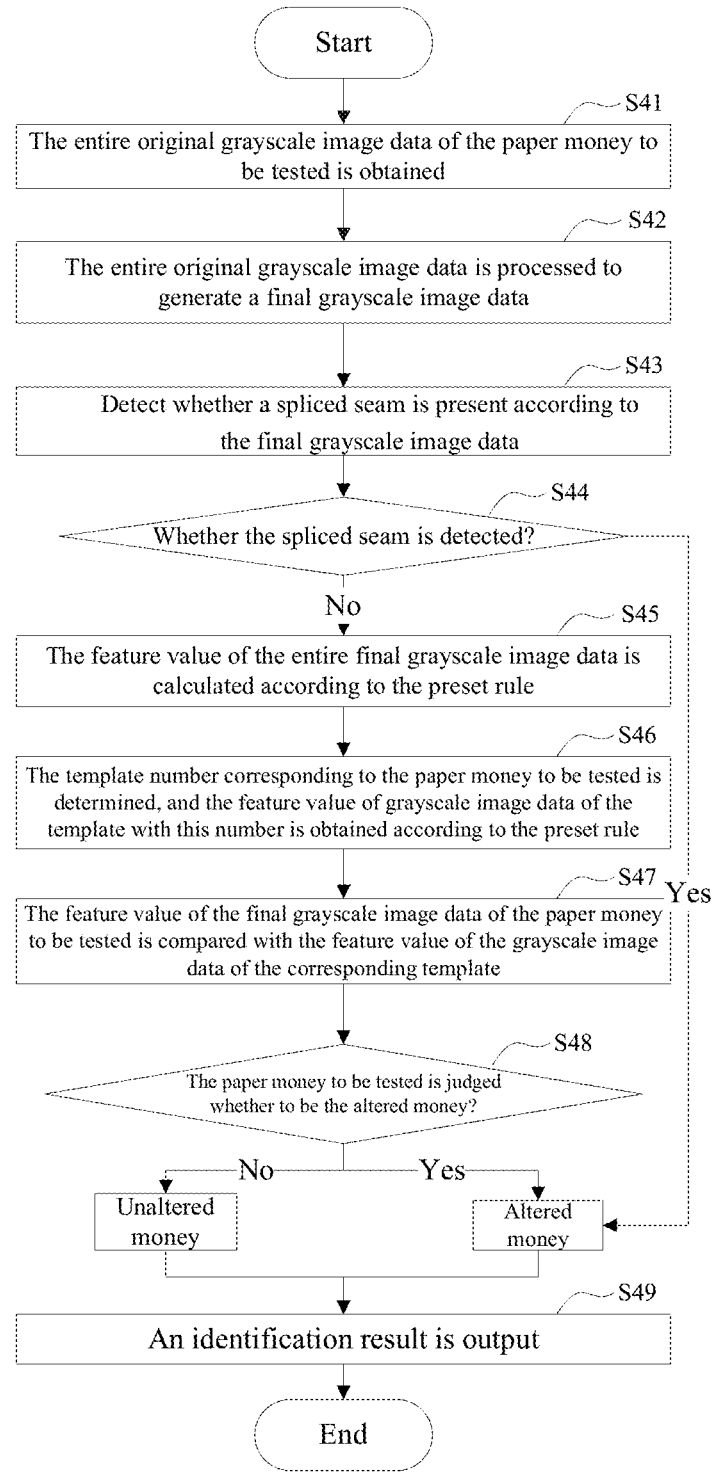
FIG. 8 is a flow chart of a third embodiment of a paper money identification method according to the disclosure.

FIG. 8 is a flow chart of a second embodiment of a paper money identification method according to the disclosure. The method includes that:

Step S41-Step S42, which are the same as Step S21-Step S22.

Step S43: Detect whether a spliced seam is present according to the final grayscale image data.

Figure 1A:
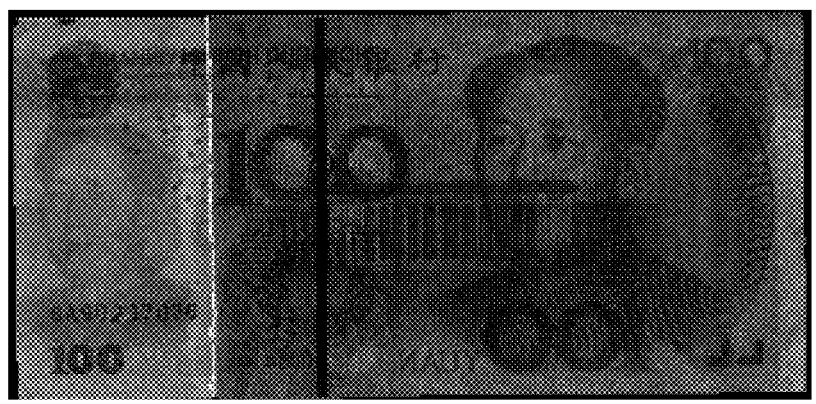
FIG. 1a is an entire image of an altered money with a relatively obvious spliced seam.
Figure 1B:
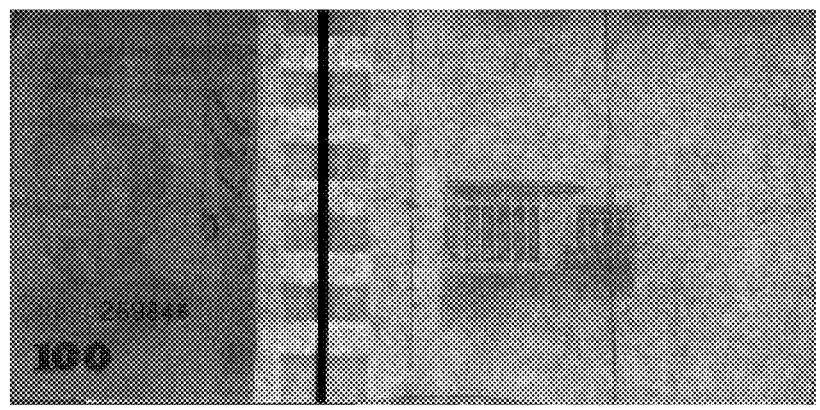
FIG. 1b is an entire image of an altered money without obvious spliced seams.
Figure 2A:
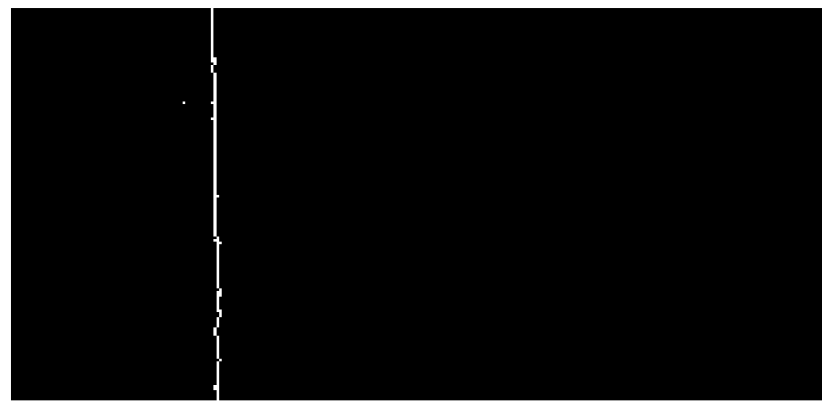
FIG. 2a is an image obtained after the entire image as shown in FIG. 1a is binarized.
Figure 2B:
FIG. 2b is an image obtained after the entire image as shown in FIG. 1b is binarized.

The final grayscale image data of the paper money to be tested stored in the SDRAM memory is read. Detect whether a spliced seam is present according to the final grayscale image data as follows: the grayscale values of all the pixels in the grayscale image of the paper money to be tested are detected line by line firstly, then the grayscale value of each pixel of each line is compared with the grayscale value of previous pixel adjacent to the pixel in this line dot-to-dot, to judge whether the difference of grayscale values between the current pixel and the previous pixel adjacent thereto exceeds the third preset threshold. The position where the pixel is located (simply an abrupt changed dot for short) is recorded when the difference of grayscale values exceeds the third preset threshold. When the grayscale values of all the pixels in the entire grayscale image of the paper money to be tested are detected line by line, the positions of all the abrupt changed dots detected are judged whether to comply with a preset rule, for example, the positions of all the abrupt changed dots are within a column of certain scope. When the positions of all the abrupt changed dots comply with the preset rule, a spliced seam is judged to be present in the paper money to be tested. When there is no abrupt changed dot or the positions of all the abrupt changed dots do not comply with the preset rule, the grayscale values of all the pixels in the grayscale image of the paper money to be tested are detected column by column. The grayscale value of each pixel of each column is compared with the grayscale value of previous pixel adjacent to the pixel in this column dot-to-dot to judge whether the difference of grayscale values of the current pixel and the previous pixel adjacent thereto exceeds the third preset threshold. When the difference of grayscale values exceeds the third preset threshold, the position where the pixel is located (simply an abrupt changed dot for short) is recorded. After the grayscale values of all the pixels in the entire grayscale image of the paper money to be tested are detected column by column, the positions of all the abrupt changed dots detected are judged whether to comply with the preset rule, for example, the positions of all the abrupt changed dots are within a line of certain scope. When the positions of all the abrupt changed dots comply with the preset rule, a spliced seam is judged to be present in the paper money to be tested. By this method, for the altered money with the relatively obvious spliced seam, for example the altered money as shown in FIG. 1a, the spliced seam in the image can be detected very easily.

Step S44: The spliced seam is judged whether to be detected.

The detection result in Step S43 is read to judge whether the spliced seam is detected by the final grayscale image data of the paper money to be tested. If yes, the paper money to be tested is judged to be the altered money, and execute Step S49. If no, execute Step S45.

Step S45-Step S49 are the same as Step S23-Step S27 of the flow of the first embodiment as shown in FIG. 6.

Since the spliced seam detection method in Step S43 has the advantages of small amount of processed data, fast processing speed or the like relative to the detection method in which the feature value of the entire image data is calculated according to the preset rule in Step S45-Step S47 and compared with the feature value of the grayscale image data of the template, after the entire grayscale image data of the paper money to be tested is obtained, the spliced seam is detected whether to be present initially by the method in Step S43. The method can judge the authenticity of the paper money with obvious spliced seam rapidly, so the efficiency of identifying the paper money is improved.

Specially, when the paper money identification device collects an image based on the transmission light source, the reflection light source and the light source of different wavelengths, it is necessary to identify the authenticity of the paper money to be tested with respect to each grayscale image collected. When the spliced seam is judged to be present in the paper money to be tested by any of the grayscale images, the paper money to be tested is judged to be the altered money. The accuracy and reliability of identifying the paper money may be improved by detecting the multiple grayscale images collected based on the light sources of different types and different wavelengths.

It should be noted that the steps shown in the flow charts of the drawings may be executed in a computer system having a group of computer-executable instructions, and although a logic sequence is shown in the flow charts, in some cases, the steps shown or described may be executed in an order different from here.

The embodiment of the disclosure also provides a paper money identification device corresponding to the paper money identification method provided by the embodiment of the disclosure. It should be noted the paper money identification method of the embodiment of the disclosure may be executed by the paper money identification device provided by the embodiment of the disclosure, and the paper money identification device of the embodiment of the disclosure may also be used to execute the paper money identification method provided by the embodiment of the disclosure.

The paper money identification device of the embodiment of the disclosure is described as follows.

Figure 10:
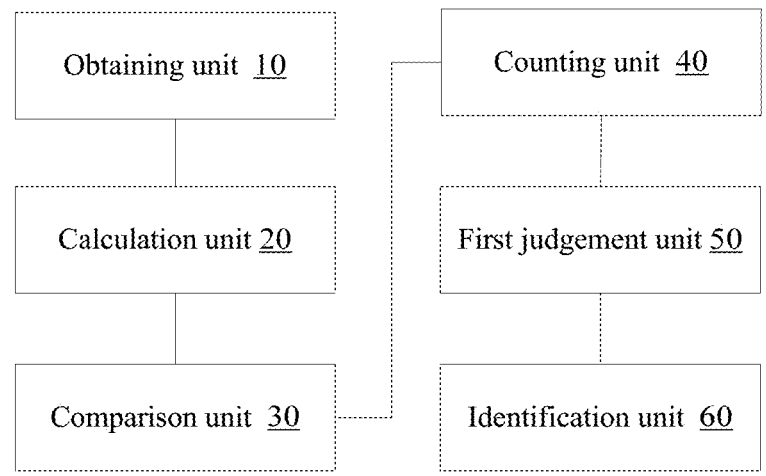
FIG. 10 is a flow chart of a first embodiment of a paper money identification device according to the disclosure.

FIG. 10 is a flow chart of a first embodiment of a paper money identification device according to the disclosure. As shown in FIG. 10, the paper money identification device includes an obtaining unit 10, a calculation unit 20, a comparison unit 30, a counting unit 40, a first judgment unit 50 and an identification unit 60.

The obtaining unit 10 is configured to obtain the entire grayscale image data of the paper money to be tested.

The calculation unit 20 is configured to divide the entire grayscale image of the paper money to be tested into a plurality of areas, and calculate the feature value of the image data of each area respectively.

The comparison unit 30 is configured to compare the feature value of each area with the feature value of a corresponding area in a paper money template to judge whether the two compared areas are matched, wherein, the two compared areas are judged to be unmatched if the difference between the feature values of the two compared areas is greater than a first preset threshold, otherwise the two compared areas are judged to be matched.

The counting unit 40 is configured to count the number of unmatched areas of the paper money to be tested.

The first judgment unit 50 is configured to judge whether the number of the unmatched areas of the paper money to be tested is greater than a second preset threshold.

The identification unit 60 is configured to determine that the paper money to be tested is the altered money when the number of the unmatched areas of the paper money to be tested is judged to be greater than the second preset threshold.

Figure 11:
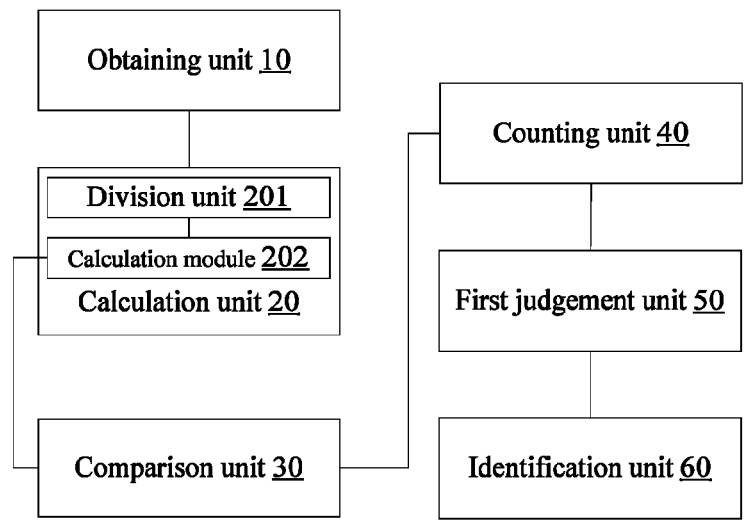
FIG. 11 is a flow chart of a second embodiment of a paper money identification device according to the disclosure.

FIG. 11 is a flow chart of a second embodiment of a paper money identification device according to the disclosure. The embodiment may be used as a further preferred embodiment of the first embodiment.

The paper money identification device includes an obtaining unit 10, a calculation unit 20, a comparison unit 30, a counting unit 40, a first judgment unit 50 and an identification unit 60.

The calculation unit 20 further includes a division module 201 and a calculation unit 202.

The division module 201 is configured to divide the entire grayscale image of the paper money to be tested into a plurality of areas in many different dividing ways.

The calculating module 202 is configured to calculate a feature value of the image data of each area in each dividing way respectively.

At this time, the comparison unit 30 is configured to compare the feature value of each area in each of many different dividing ways with the feature value of a corresponding area in a paper money template in a corresponding dividing way to judge whether the two compared areas are matched. The identification unit 60 is configured to determine that the paper money to be tested is the altered money when the number of the unmatched areas of the paper money to be tested is judged to be greater than the second preset threshold in any way of many different dividing ways.

In the embodiment, When the entire grayscale image of the paper money to be tested is divided in a different dividing way, the number of the areas divided in different way may be the same, and may also be different, wherein, when the numbers of the areas divided in different dividing ways are different, the values of the second preset threshold determined in two dividing ways may also be different.

Figure 12:
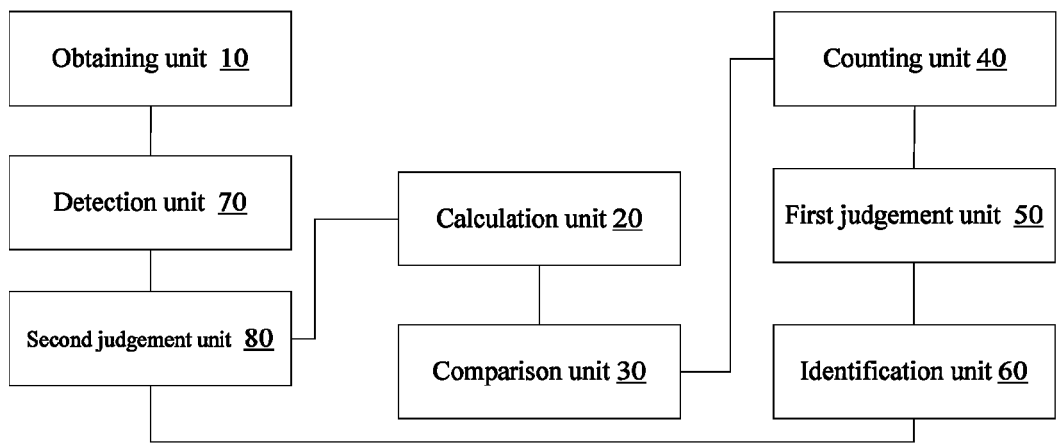
FIG. 12 is a flow chart of a third embodiment of a paper money identification device according to the disclosure.

FIG. 12 is a flow chart of a third embodiment of a paper money identification device according to the disclosure. The embodiment may be used as a still further preferred embodiment of the first embodiment.

The paper money identification device also includes a detection unit 70 and a second judgment unit 80 in addition to the obtaining unit 10, the calculation unit 20, the comparison unit 30, the counting unit 40, the first judgment unit 50 and the identification unit 60 described above.

The detection unit 70 is configured to detect whether a spliced seam is present according to the entire grayscale image data before dividing the entire grayscale image of the paper money to be tested into a plurality of areas and calculating the feature value of the image data of each area.

The second judgment unit 80 is configured to judge whether the spliced seam is detected according to a detection result.

In the embodiment, the identification unit 60 is configured to determine that the paper money to be tested is the altered money when determining that the spliced seam is detected. The calculation unit 20 is configured to divide the entire grayscale image of the paper money to be tested into a plurality of areas and calculate the feature value of the image data of each area when determining that the spliced seam is not detected.

Obviously, those skilled in the art should understand that each of the mentioned units or steps of the disclosure can be implemented by a universal computing device; the units or steps can be focused on a single computing device, or distributed on the network formed by multiple computing devices. Selectively, they can be implemented by a program code which can be executed by the computing device. Thereby, the units or steps can be stored in a storage device and executed by the computing device; or the units or steps can be respectively manufactured as each integrated circuit module, or multiple modules or steps thereof can be manufactured to be a single integrated circuit module, thus to be implemented. In this way, the disclosure is not limited to any particular hardware and software combination.

The above are only the preferred embodiment of the disclosure and are not intended to limit the disclosure, and for those skilled in the art, various changes and variations can be made to the disclosure. Any modifications, equivalent replacements, improvements and the like within the spirit and principle of the disclosure shall be contained within the scope of protection of the claims of the disclosure.

What is claimed is:

1. A paper money identification method, comprising:
   obtaining entire grayscale image data of a paper money to be tested;
   dividing the entire grayscale image of the paper money to be tested into a plurality of areas, and calculating a feature value of the image data of each area respectively;
   comparing the feature value of each area with the feature value of a corresponding area in a paper money template to judge whether two compared areas are matched, wherein the two compared areas are judged to be unmatched if a difference between the feature values of the two compared areas is greater than a first preset threshold, otherwise the two compared areas are judged to be matched;
   counting the number of unmatched areas of the paper money to be tested;
   judging whether the number of the unmatched areas of the paper money to be tested is greater than a second preset threshold; and
   determining that the paper money to be tested is altered money when the number of the unmatched areas of the paper money to be tested is judged to be greater than the second preset threshold,
   wherein, for each area, the feature value of the image data of the area is calculated by:
   equally dividing the area into a first area and a second area;
   calculating a first grayscale average of the first area and a second grayscale average of the second area; and
   calculating the feature value of the image data by determining an absolute value of a difference between the first grayscale average and the second grayscale average.

2. The paper money identification method according to claim 1, wherein, obtaining the entire grayscale image data of the paper money to be tested comprises:
   obtaining entire original grayscale image data of the paper money to be tested; and
   generating entire final grayscale image data of the paper money to be tested according to the entire original grayscale image data, and setting the entire final grayscale image data as the entire grayscale image data of the paper money to be tested.

3. The paper money identification method according to claim 1, wherein,
   dividing the entire grayscale image of the paper money to be tested into a plurality of areas, and calculating the feature value of the image data of each area respectively comprises: dividing the entire grayscale image of the paper money to be tested into a plurality of areas in a plurality of different dividing ways, and calculating a feature value of the image data of each area in each dividing way respectively; and comparing the feature value of each area with the feature value of the corresponding area in the paper money template to judge whether the two compared areas are matched comprises: comparing the feature value of each area in each of the plurality of different dividing ways with the feature value of a corresponding area in a paper money template in a corresponding dividing way to judge whether the two compared areas are matched;

wherein the paper money to be tested is determined to be the altered money when the number of the unmatched areas of the paper money to be tested is judged to be greater than the second preset threshold in any one way of the plurality of different dividing ways.

4. The paper money identification method according to claim 1, further comprising, prior to dividing the entire grayscale image of the paper money to be tested into a plurality of areas and calculating the feature value of the image data of each area respectively:

detecting whether a spliced seam is present according to the entire grayscale image data; and judging whether the spliced seam is detected according to a detection result, wherein, the paper money to be tested is determined to be the altered money when the spliced seam is determined to be detected, and then the entire grayscale image of the paper money to be tested is divided into a plurality of areas and the feature value of the image data of each area is calculated respectively when the spliced seam is determined to be undetected.

5. The paper money identification method according to claim 1, wherein, obtaining the entire grayscale image data of the paper money to be tested comprises obtaining the entire grayscale image data of the paper money to be tested in a plurality of different ways, wherein the paper money to be tested is judged to be the altered money when the entire grayscale image data obtained in any one way determines that the paper money to be tested is the altered money.

6. A paper money identification device, comprising:

a CPU and a memory, wherein the CPU is configured to:

obtain entire grayscale image data of the paper money to be tested;

divide the entire grayscale image of the paper money to be tested into a plurality of areas, and calculate a feature value of the image data of each area respectively;

compare the feature value of each area with the feature value of a corresponding area in a paper money template to judge whether the two compared areas are matched, wherein, the two compared areas are judged to be unmatched if the difference between the feature values of the two compared areas is greater than a first preset threshold, otherwise the two compared areas are judged to be matched;

count the number of unmatched areas of the paper money to be tested;

judge whether the number of the unmatched areas of the paper money to be tested is greater than a second preset threshold; and determine that the paper money to be tested is altered money when the number of the unmatched areas of the paper money to be tested is judged to be greater than the second preset threshold wherein, for each area, the feature value of the image data of the area the CPU is further configured to:

equally divide the area into a first area and a second area;

calculate a first grayscale average of the first area and a second grayscale average of the second area; and calculate the feature value of the image data based on an absolute value of a difference between the first grayscale average and the second grayscale average.

7. The paper money identification device according to claim 6, wherein the CPU is further configured to:

divide the entire grayscale image of the paper money to be tested into a plurality of areas in a plurality of different dividing ways, and a calculating module, configured to calculate a feature value of the image data of each area in each dividing way respectively, compare the feature value of each area in each of the plurality of different dividing ways with the feature value of a corresponding area in a paper money template in a corresponding dividing way to judge whether the two compared areas are matched, and determine that the paper money to be tested is the altered money when the number of the unmatched areas of the paper money to be tested is judged to be greater than the second preset threshold in any one way of the plurality of different dividing ways.

8. The paper money identification device according to claim 6, wherein, prior to the division of the entire grayscale image of the paper money to be tested into a plurality of areas and calculation of the feature value of the image data of each area respectively, the CPU is further configured to:

detect whether a spliced seam is present according to the entire grayscale image data;

judge whether the spliced seam is detected according to a detection result;

in response to a determination that the spliced stream is detected, determine that the paper money to be tested is the altered money;

in response to a determination that the spliced stream is not detected, divide the entire grayscale image of the paper money to be tested into a plurality of areas and calculate the feature value of the image data of each area respectively.

* * * * *